United States Patent [19]

Bronicki

[11] Patent Number: 4,551,980
[45] Date of Patent: Nov. 12, 1985

[54] HYBRID SYSTEM FOR GENERATING POWER

[75] Inventor: Lucien Y. Bronicki, Rehovot, Israel

[73] Assignee: Ormat Turbines, Ltd., Yavne, Israel

[21] Appl. No.: 479,012

[22] Filed: Mar. 25, 1983

[51] Int. Cl.$^4$ ................................................ F03G 7/02
[52] U.S. Cl. .................................... 60/698; 60/641.8; 136/291; 290/1 R; 290/4 R
[58] Field of Search ................ 136/291, 293; 60/698, 60/641.8, 721; 290/1 R, 4 R, 52

[56] References Cited

U.S. PATENT DOCUMENTS 3,409,782 11/1968 Bronicki ............................ 60/641.8

OTHER PUBLICATIONS

"Closed Cycle Vapor Turbogenerator A Reliable Remote Prime Power Source" by N. S. Christopher et al, pp. 443-449.
N. S. Christopher and J. Gropper, "Closed Cycle Vapor Turbogenerator-A Reliable Remote Prime Power Source", INTELEC, Washington, D.C., Oct. 1982, pp. 443-449.
"470-KW Photovoltaic Power System"; by Matthew Imamura et al; Proceedings of the 15th Intersociety Energy Conversion; Seattle, Washington, Aug. 1980, (pp. 18-22).
"Photovoltaic/Thermoelectric Refrigerator", by R. Field, Solar Energy, vol. 25, pp. 445-447, Jun. 1980.

Primary Examiner—Allen M. Ostrager
Attorney, Agent, or Firm—Sandler & Greenblum

[57] ABSTRACT

An intermittently operable non-fuel-consuming power generator, such as a photovoltaic array or a wind generator, is connected through a control circuit to a battery for for charging the same and supplying current to a time-wise substantially constant electrical load. An electrical generator, connected to an intermittently operable prime mover, charges the battery and supplies current to the electrical load when the prime mover is operated. A sensor circuit senses at least one electrical parameter, such as a failure of the power generator to produce current, for controlling the operation of the prime mover (i.e., starting of the prime mover). The sensor circuit also senses a second electrical parameter, such as the charge level of the battery. The prime mover is made operational only if the battery capacity is less than a predetermined threshold level when the power generator fails to produce current.

10 Claims, 1 Drawing Figure

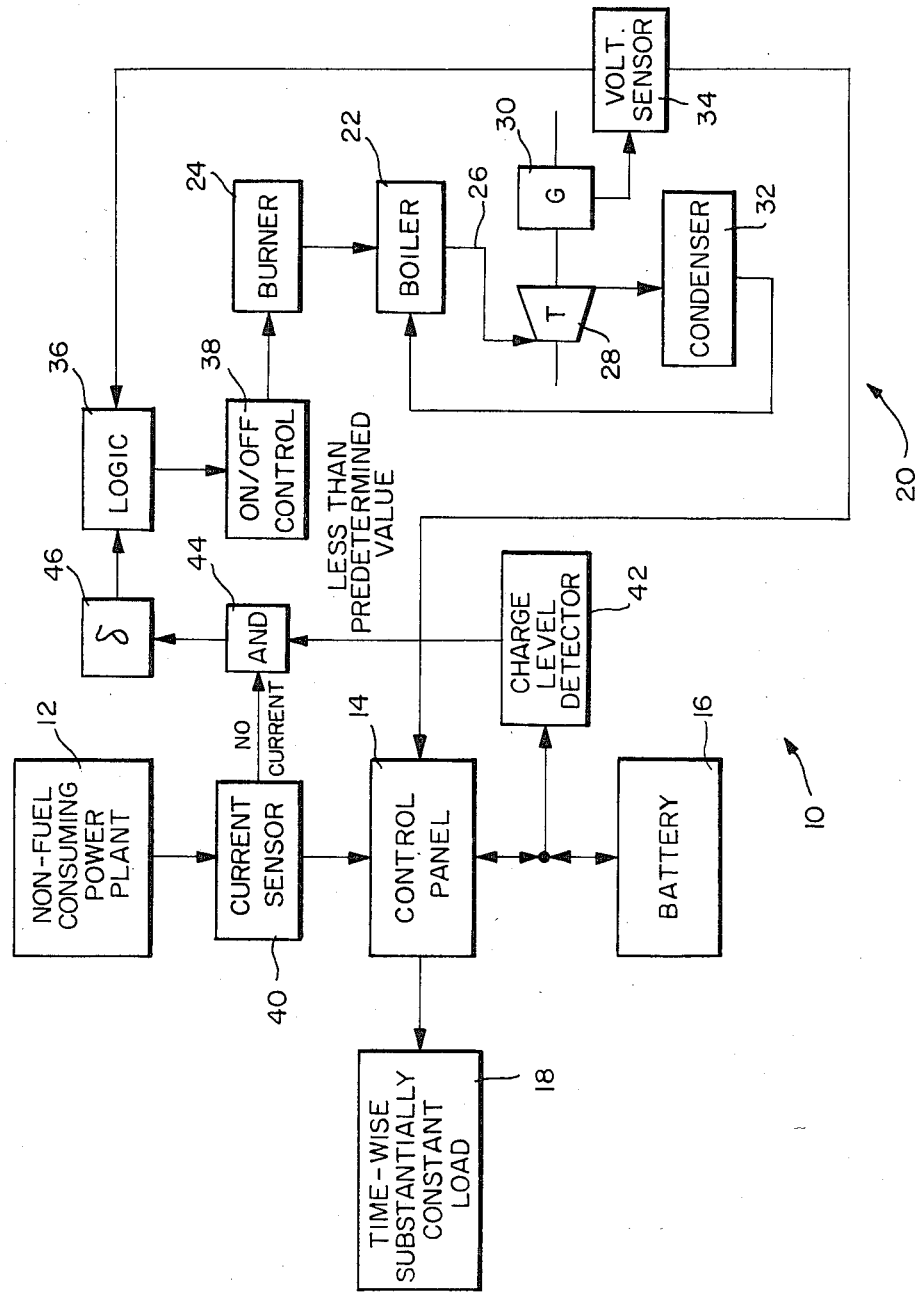

HYBRID SYSTEM FOR GENERATING POWER

DESCRIPTION

1. Technical Field

This invention relates to a parallel hybrid system for generating power, and more particularly to a system utilizing a Rankine cycle organic fluid vapor turbogenerator as one source of power, hereinafter referred to as a power plant of the type described.

2. Background Art

Solar operated systems now in operation for powering telecommunication projects require from 100 to 3000 watts on a continuous basis, day and night. By reason of the dependence of such systems on sunlight, over-design of the systems are required in order to meet contingent operating and environmental conditions. For example, an array of photovoltaic sources is typically sized eight or more times larger than the peak load; and a ten day battery back-up reserve is oftentimes provided.

In an effort to down-size both the photovoltaic array and the back-up battery, hybrid systems are in use utilizing a fueled prime-mover driving a generator that charges the batteries. One such hybrid system employs a Rankine cycle organic fluid turbogenerator (hereinafter referred to as a power plant of the type described) manufactured by Ormat Turbines Ltd. and described in U.S. Pat. No. 3,409,782.

Such a hybrid system is described in "Closed Cycle Vapor Turbogenerator—A Reliable Remote Prime Power Source" by N. S. Christopher and J. Gropper, presented at the International Telecommunications Energy Conference in Washington, D.C. Oct. 1982 and printed in pages 443-449, which is hereby incorporated by reference.

A power plant of the type described has a Rankine cycle turbogenerator utilizing an organic fluid, such as a chloroloeuzene or Freon, as the operating fluid; and the turbogenerator is hermetically sealed in a cannister. Only the turbine and the generator of the turbogenerator move; and the shaft carrying these components is mounted on bearings lubricated with the operating fluid thus eliminating metal-to-metal wear and permitting the turbogenerator to run continuously for long periods of time without overhaul and with little maintenance. An external, fuel-fired burner heats an evaporator which vaporized the liquid organic fluid and supplies hot vapor to the turbine. The vapor expands in the turbine which drives the generator producing power. Exhaust vapor from the turbine is condensed in an air-cooled condenser; and the resultant liquified organic fluid is returned to the evaporator. Some of the condensate, however, is returned to the evaporator through the bearings of the turbogenerator as described previously. A single on/off fuel supply to the burner is used for controlling the voltage of the system: the burner is turned-on whenever the voltage of the system drops below a first threshold and is turned-off whenever the voltage of the system rises above a second threshold. This arrangement provides a particularly simple and reliable control for the turbogenerator. Because of the high starting and running reliability of the system of the type described, the hybrid power plant described above has a battery capacity that is only 60% as large as the capacity of a power plant that relies upon photovoltaic cells only.

Another advantage of the hybrid power plant that arises because of the reduction in battery capacity is the reduction in self-discharge losses in the batteries. Consequently the trickle charge required to maintain the battery is also smaller than a power plant relying only on photovoltaic cells. The hybrid power plant also enjoys a significant cost advantage when the static load increases into the multi-hundred watt range.

A hybrid power plant of the type described is thus very advantageous in terms of cost and reliability; and it is an object of the present invention to provide a new improved hybrid power plant of the type described which is even more efficient and cost effective.

DISCLOSURE OF INVENTION

A hybrid power plant according to the present invention includes an intermittently operable non-fuel consuming power generator, such as a photovoltaic cell array, or a wind generator, connected through a control-circuit to a battery for charging the same during operation of the power generator, and for supplying current to a time-wise, substantially constant, electrical load. In addition, the hybrid power plant includes an electric generator connected to an intermittently operable prime mover for charging the battery and supplying current to the electrical load when the prime mover is operated; and a sensor circuit for sensing at least one electrical parameter of the power plant, such as a failure of the power generator to produce current, for controlling the operation of the prime mover (i.e., starting and operating the prime mover). With this arrangement, the prime mover is operable only when the power generator is not operating. In the case of photovoltaic array, this situation occurs each night so that the prime mover of the hybrid power plant can be started only after sunset.

When the prime mover is a Rankine cycle organic fluid vapor turbogenerator, of the type described, the efficiency of the prime mover is enhanced by delaying its start-up until ambiant temperature conditions are optimum as compared to daytime temperature conditions. Thus, a delay in starting up the turbogenerator results in the presence of a lower condenser temperature which optimizes fuel consumption of the turbogenerator.

In the prefered embodiment of a hybrid power plant comprising an array of photovoltaic cells in combination with a Rankine cycle organic fluid vapor turbogenerator, the charge level of the battery is continuously monitored; and the turbogenerator is made operational only if the battery charge is less than a predetermined threshold, for example, a threshold representing the charge produced by a full day of operation of the photovoltaic cells. In this way, the operation of the turbogenerator is optimized with respect to the thermal efficiency of the Rankine cycle.

BRIEF DESCRIPTION OF THE DRAWING

An embodiement of the invention is shown in the single figure of the accompanying drawing which is a block diagram of a parallel, hybrid power plant according to the present invention.

DETAILED DESCRIPTION

Turning now to the drawing, reference numeral 10 designates a parallel hybrid power plant according to the present invention. Power plant 10 comprises intermittently operable non-fuel-consuming power generator 12, such as a photovoltaic array or a wind generator, connected through control circuit 14 to battery 16 for charging the same during operation of power generator 12, and for supplying current to time-wise, substantially constant electrical load 18. An example of such an electrical load is the equipment found in a typical remote microwave repeater station such as used in a telecommunication network. Each repeater station in a such network has an electrical load of the order of 1 kW which is required day and night.

In addition to power generator 12, hybrid power plant 10 includes a Rankine cycle organic fluid turbogenerator 20 such as that manufactured by Ormat Turbines Ltd. and described in U.S. Pat. No. 3,409,782. System 20 comprises vaporizer 22 containing an organic fluid, such as one of the chlorobeuzene or Freons, which is vaporize in the evaporator when heat is applied by burner 24.

The vaporized organic fluid is passed through conduit 26 into turbine 28 where the vaporized working fluid expands causing the turbine to drive generator 30 which produces electricity that is furnished to battery 16 through control panel 14. Working fluid exhausted from turbine 28 is condensed in condenser 32 and returned to boiler 22 either by gravity or with a feed pump (not shown). As explained in U.S. Pat. No. 3,409,782, the rotor of turbine 28 and the rotor of generator 30 are mounted on a common shaft which is journaled in fluid film bearings to which condensate from condenser 32 is supplied. Both the turbine and the generator are hermetically sealed in a cannister; and the thermodynamic cycle by which the organic working fluid is converted into a vapor and then back into a liquid is known as the Rankine cycle.

Because the generator is mounted on the same shaft as the turbine and rotated at the same speed, the output voltage of the generator is functionally related to the shaft speed and the excitation current flowing through the windings of the generator. The power output of the power plant depends on the amount of heat furnished by the burner. Because the burner is located outside of the cannister, the turbine rotor and the generator are isolated from combustion contaminants which enhances the life of this system.

The upper voltage of generator 30 is regulated by controlling the amount of fuel flowing to the burner. Voltage sensor 34 senses the output voltage of generator 30 and supplies an electrical signal through logic circuit 36 to on/off control circuit 38 which serve to ignite and turn on or turn off the fuel supply to burner 24. In operation, when the voltage produced by generator 30 exceeds a preset upper threshold, voltage sensor 34 sends a signal to control 38 which is effective to turn off the fuel supply to burner 24.

In operation, when the voltage produced by generator 30 exceeds a preset upper threshold, voltage sensor 34 sends a signal to control 38 which is effective to turn off the fuel supply to burner 24. The reduction in the amount of vapor produced by boiler 22 as a consequence reduces the turbine speed which reduces the output voltage of the generator; and when voltage sensor 34 sensors a lower voltage threshold, the signal sent by the voltage sensor to control 38 turns on the burner. The vapor produced by boiler 22 thus increases; and the increase in the amount of vapor increases the turbine speed which results in an increase in the output voltage of the generator. The output voltage of turbogenerator 30 then increases and the voltage regulation cycle is repeated. Thus, generator 30 is effectively connected to an intermittently operable prime mover for charging battery 16 and supplying current to electrical load 18 when the prime mover is operated.

System 10 also includes a sensor circuit in the form of current sensor 40, and charge level detector 42. Sensor 40 is connected between power generator 12 and control panel 14 and senses the production of current by generator 12. When generator 12 is constituted by an array of photovoltaic cells, current sensor 40 will produce an output indicating the time of day. That is to say, sensor 40 will have zero output during daylight hours, while at the onset of sunset and during night-time, sensor 40 will produce a signal level that indicates a lack of current from the photovoltaic cells. Thus, current sensor 40 always indicates time in the sense that it descriminates between daytime hours and night time.

Charge level detector 42 is a conventional device such as a curtis bi-polar and hour controller and continuously monitors the charge level on battery 16. The threshold of the detector 42 is set at some predetermined percentage of full charge of battery 16. Preferably, the threshold of detector 42 is set below the rated capacity of battery 16 by an amount substantially equal to one day's supply of power by the photovoltaic array of generator 12. Finally, detector 42 will produce an output signal level whenever the charge on battery 16 is below the set predetermined value.

The outputs of sensors 40 and 42 are applied to AND circuit 44 which produces an output signal only when both inputs to this circuit are present simultaneously. Thus, AND circuit 44 produces an output signal only when the photovoltaic cells produce no current (i.e. at night) and the charge level of battery 16 is below the threshold of detector 42.

Preferably, although not necessarily, the output of AND circuit 44 is delayed electrically by delay circuit 46 and applied to logic circuit 36 which controls the operation of on/off control 38. Delay 46 is preferably on the order of magnitude of one or two hours for the reasons indicated below.

In operation, during daylight hours, photovoltaic cell array generator 12 will produce sufficient current to supply charge to battery 16. After sunset, generator 12 will produce no further current; and this condition is sensed by sensor 40 which produces a signal level applied to AND gate 44. Battery 16, in response to the cessation of the flow current from the photovoltaic array then takes over and furnishes current to load 18. Detector 42 monitors the charge level of the battery; and if the charge level remains above the predetermined level set in the detector, then power plant 20 remains out of operation. This situation is the design condition and will usually occur.

Sometimes, due to inclement weather conditions, power generator 12 will be incapable of furnishing sufficient power to load 18 even during daylight hours; in such case, control panel 14 will become effective to switch to battery 16 which is able to furnish all of the current needed by load 18 for a number of days. Even is detector 42 were triggered, during battery operation, by detection of the threshold charge on the battery, power plant 20 will remain dormant until sundown (i.e., no current detected by sensor 40). When nightfall occurs, sensor 40 produces a signal indicating this condition. If, at this time, the charge level of battery 16 as monitored by detector 42 is below the threshold set into the detector, AND gate 44 responds by producing a signal which is applied through delay circuit 46 to logic circuit 36 and which will be effective to initiate start-up of power plant 20.

The reason for imposing a delay in starting up the operation of power plant 20 is to ensure that ambient conditions are optimum for the most efficient operation of the power plant. That is to say, turn-on of power plant 20 is delayed until several hours after sunset in order for ambient temperature to drop thereby increasing the efficiency of air cooled condenser 32 and optimizing fuel use by power plant 20.

The operation of power plant 20 continues until either the level of charge on battery 16 reaches the threshold set into detector 42 or daylight occurs. In either case, power plant 20 is shut down by control 38 and the load is supplied by battery 16 alon or by the photovoltaic array. In this way, power plant 20 is operated and fuel is consumed, for no more time than is absolutely necessary.

The advantages and proved results furnished by the method of operation of the present invention are apparent from the foregoing description of the prefered embodiment of the invention. Various changes in the mode of operation made but without departing from the spirit or scope of the invention as described in the claims that follow.

What is claimed is:

1. A power plant for supplying electricity to an electrical load comprising:
    (a) an intermittently operable non-fuel-consuming power generator connected through a control circuit to a battery for charging the latter during operation of the power generator;
    (b) an electrical power generator connected to a prime mover in the form of a closed Rankine cycle vapor turbine for charging the battery and supplying current to the electrical load when the prime mover is operated;
    (c) a sensor circuit for sensing at least one electrical parameter of the power plant and thereby controlling the operation thereof;
    (d) control means responsive to the sensor circuit for operating the turbine, said control means being constructed and arranged to control the operation of the turbine by controlling the fuel supply for the turbine; and
    (e) a delay circuit interposed between the sensor circuit and the control means for preventing the sensor circuit from exerting control over the operation of the turbine until the lapse of a predetermined time interval after said at least one electrical parameter is sensed.

2. A power plant according to claim 1 wherein said at least one electrical parameter is the absence of current being supplied by the array of photovoltaic cells.

3. A power plant according to claim 1 wherein said at least one electrical parameter is a threshold level of charge on the battery.

4. A power plant according to claim 3 when the threshold level is no more than a full day's charge.

5. A power plant according to claim 1 wherein said sensor circuit monitors the current being supplied by the array of photovoltaic cells and the level of charge on the battery, and said control means is responsive to the simultaneous occurrence of two conditions: absence of current being supplied by the array of photovoltaic cells, and the presence of less than a predetermined level of charge on the battery for turning on the fuel supply of the turbine.

6. A power plant according to claim 5 wherein the sensor circuit is effective to turn on the fuel supply only a predetermined time after said two conditions are met.

7. A power plant according to claim 6 wherein the sensor circuit is effective to turn-off the fuel supply when said two conditions are met.

8. A power plant for supplying electricity to an electrical load comprising:
    (a) a non-fuel consuming power source, in the form of an array of photovoltaic cells, for intermittently generating power;
    (b) a battery system for supplying power;
    (c) an electrical power generator connected to a selectively operable fuel-consuming prime mover, in the form of a closed Rankine cycle organic fluid turbine power plant whose operating efficiency peaks during non-daylight hours, for generating power when said prime mover is operated;
    (d) interconnection means for connecting said non-fuel consuming power source, said battery system, and said power generator to said load in parallel;
    (e) battery condition sensor means for sensing for sensing the charge level of said battery which is associated with the ability of the battery system to supply power;
    (f) power source condition sensor means for sensing an the flow of current produced by said power source which is an electrical parameter associated with the ability of the power source to generate power; and
    (g) logic means responsive to the simultaneous occurrence of less than threshold values of said charge level and said flow of current for operating said prime mover;
    (h) said logic means being constructed and arranged to operate said prime mover only after a predetermined time delay following said simultaneous occurrences to insure operation of said prime mover only during non-daylight hours.

9. A power plant according to claim 8 wherein said Rankine cycle power plant includes an air-cooled condenser for effecting the most efficient operation of the last-mentioned power plant during non-daylight hours.

10. A power plant according to claim 8 wherein said Rankine cycle power plant includes a burner for burning fuel, and an on/off control for controlling the supply of fuel to said burner, said on/off control being operated by said logic means.

* * * * *